United States Patent [19]
Weber

[11] Patent Number: 6,131,558
[45] Date of Patent: Oct. 17, 2000

[54] SAW WIRE WITH A PEARL

[75] Inventor: Ludger Weber, Eschenburg, Germany

[73] Assignee: Buediam Diamantwerkzeuge R. und N. Buettner GmbH, Eschenburg, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/228,010

[22] Filed: Jan. 8, 1999

[30] Foreign Application Priority Data

Jan. 27, 1998 [DE] Germany ............... 198 02 938

[51] Int. Cl.⁷ ....................................... B28D 1/08
[52] U.S. Cl. ................................. 125/21; 125/22
[58] Field of Search ................... 125/21, 22, 12, 125/36; 156/338, 324, 33.1, 901; 264/236, 331.13, 347; 403/225, 299, 307, 334; 24/136 B, 136 L; 57/906; 204/12, 27, 28

[56] References Cited

U.S. PATENT DOCUMENTS

| | | | |
|---|---|---|---|
| Re. 29,491 | 12/1977 | Snow | 125/21 |
| 3,598,101 | 8/1971 | Hensley | 125/21 |
| 4,016,857 | 4/1977 | Hall | 125/21 |
| 4,856,490 | 8/1989 | Kawase et al. | 125/21 |
| 4,907,564 | 3/1990 | Sowa et al. | 125/21 |

FOREIGN PATENT DOCUMENTS

| | | | |
|---|---|---|---|
| 46-18553 | 5/1971 | Japan | 125/21 |
| 3-281118 | 12/1991 | Japan . | |
| 405004223 | 1/1993 | Japan | 125/21 |
| 405285933 | 11/1993 | Japan | 125/21 |
| 406126734 | 5/1994 | Japan | 125/21 |
| 406134749 | 5/1994 | Japan | 125/21 |
| 322567 | 8/1957 | Switzerland | 125/21 |
| 48904 | 4/1989 | U.S.S.R. | 125/21 |

*Primary Examiner*—Derris H. Banks
*Attorney, Agent, or Firm*—Flynn, Thiel, Boutell & Tanis, P.C.

[57] ABSTRACT

A saw wire, in particular for use in a wire saw, with at least one saw pearl having an approximately cylindrical outer shape. The saw pearl has hard members bound into a fixed solid binding material. In order to reach a high initial cutting performance with a newly inserted saw wire, each saw pearl mounted on the saw wire has an area with a larger outer circumference and an area with a smaller outer circumference.

17 Claims, 4 Drawing Sheets

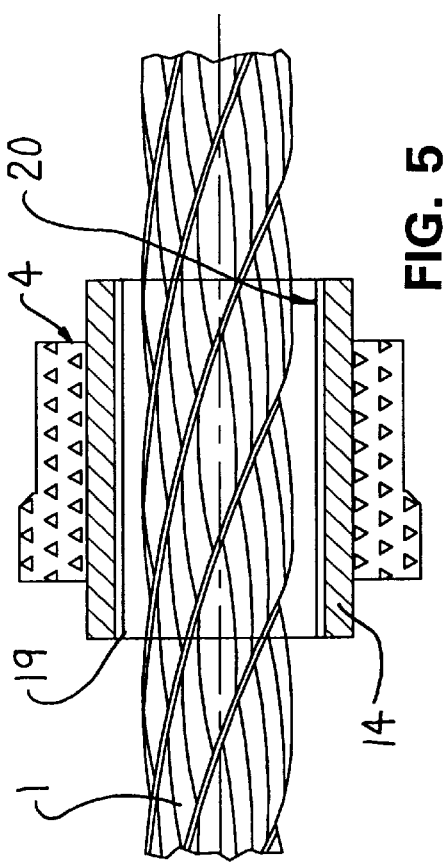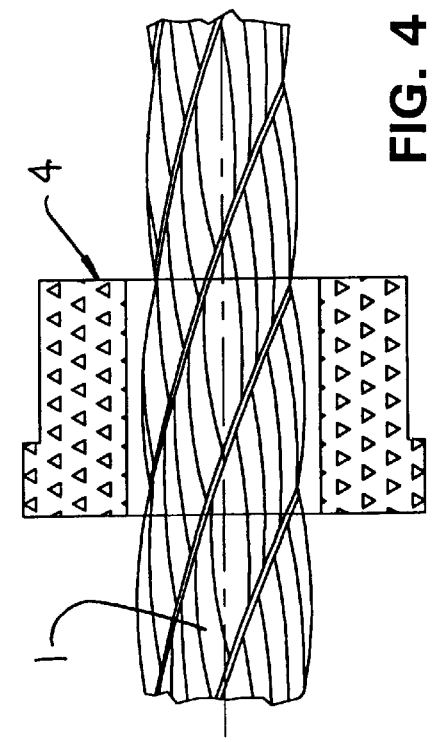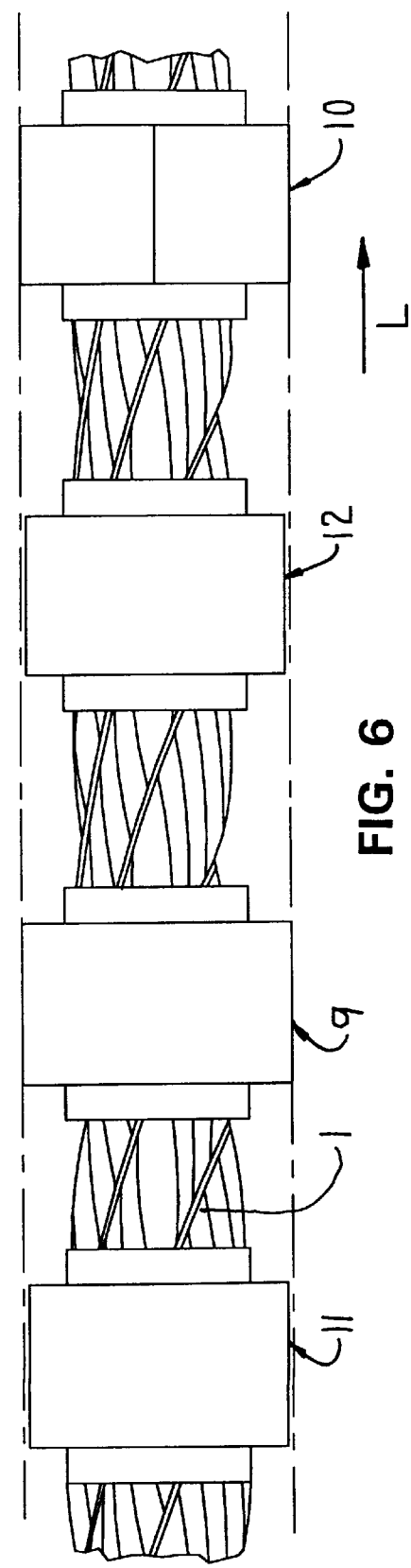

SAW WIRE WITH A PEARL

FIELD OF THE INVENTION

The invention relates to a saw wire, in particular for a wire saw, with at least one saw pearl having an approximately cylindrical outer shape. The saw pearl has hard bodies bound into a fixed solid, strong binding material.

BACKGROUND OF THE INVENTION

A saw wire is known for a wire saw. Such a wire saw has a drive system which drives the saw wire guided over several deflecting pulleys. The saw wire consists thereby of a steel wire, whereby at specific distances on the steel wire there are arranged approximately circular-cylindrical saw pearls each consisting of a sinter body. The sinter bodies have hard bodies bound into a binding means, which hard bodies are, during the manufacturing process of the saw pearls, completely arranged in the binding means so that the hard bodies at the start of time of use of the saw wire contribute little to the cutting performance. Only when the hard bodies, through wear of the binding means during the sawing operation, are partly freed from the binding means, can they contribute fully to the cutting performance. This state is achieved with a newly inserted saw wire, depending on the daily duration of use, after approximately three days. Then the maximum sawing performance is available. Whereas the sawing performance at the start of use is approximately 30% of the maximum sawing performance.

SUMMARY OF THE INVENTION

In order to remedy this, the purpose of the present invention is to provide a saw wire with saw pearls, which already after a short time of use, reach maximum cutting performance, namely the desired cutting performance.

This purpose is attained with a saw wire of the above-mentioned type in such a manner that each saw pearl has an area of larger outer circumference and an area of smaller outer circumference. In this manner, the sawing performance is initially fully produced by an area of the saw pearl which has a larger outer circumference and a reduced active grinding surface or contacting surface area, and thus projects particularly far from the saw wire. The binding means is thus very quickly removed in this reduced surface area so that the hard bodies are accordingly quickly used at the reduced surface area. Through this arrangement an initial cutting performance is achieved, which lies at approximately 90% of the maximum cutting performance possible. Furthermore, after only a short duration of use, the maximum cutting performance, namely the desired cutting performance, is already available. Thus it is possible to operate the wire saw almost continuously with full cutting performance even after an exchange of the saw wire. The maximum cutting performance is then available when the hard bodies project at approximately one third of the outer surface area along their length, from the binding means.

It is particularly advantageous when the area with a larger outer circumference of the saw pearl is arranged in an intended direction of movement of the saw wire in front of the area of a smaller outer circumference. In this manner, it is assured that first the area with a larger outer circumference engage a workpiece to be sawed and is used up or worn down to the outer circumference of the remaining area, and thus a maximum material usage of the saw pearl is guaranteed.

According to another advantageous further development of the invention, the area with a larger outer circumference of the saw pearl has, in the direction of movement of the saw wire, a lesser extent than the area with a smaller outer circumference. The binding means in the projecting area of the saw pearl is thus particularly quickly removed and the hard bodies are accordingly quickly freed. The time of use of a new saw wire, after which the maximum cutting performance is achieved, can in this manner be further reduced.

An inventive saw pearl can be particularly easily manufactured when the area with a smaller outer circumference of the saw pearl transfers with a step into the area with a larger outer circumference. The course of the cutting performance, during increased wear of the binding means, is advantageously uniform when the step has an inclination or a curve.

The cutting performance course is particularly uniform and constant when the area with a smaller outer circumference of the saw pearl, forming a cone, transfers continuously into the area with a larger outer circumference.

The saw pearl has, according to another advantageous further development of the invention, in the intended direction of movement behind the area with a smaller outer circumference, a further area with a larger outer circumference. With this arrangement, an inclined position for the saw pearl in relationship to a workpiece to be sawed is reliably avoided and thus a uniform wear of the saw pearl is assured. The further area with a larger outer circumference is advantageously followed by a further area with a smaller outer circumference. The aforedescribed areas do not need to be fixedly connected with one another, but they can also be fastened directly following one another on the saw wire, whereby protruding areas, namely areas with a larger outer circumference, can alternate with lower areas, namely areas with a smaller outer circumference. In the case of several raised areas always the next following area then takes over the full cutting performance when the preceeding area has been correspondingly removed or worn off. An enhanced cutting performance, which is already very high at the start, is achieved in this manner, which cutting performance is essentially constant during the wearing down of the saw pearls.

The abovedescribed purpose is attained with a saw wire of the abovementioned type also in such a manner that the saw wire has at least two saw pearls with different outer circumferences, and that saw pearls with respective larger and smaller outer circumferences are arranged periodically alternatingly on the saw wire, whereby in an intended direction of movement of the saw wire within one period or zone, there is arranged one saw pearl with a larger outer circumference in front of a saw pearl with a smaller outer circumference. Thus one period or zone consists of at least one saw pearl with a larger outer circumference and a saw pearl with a smaller outer circumference, whereby the firstmentioned saw pearl lies in front in an intended direction of movement of the saw wire. Further saw pearls can be arranged between these saw pearls, the outer circumference of which has a size which lies between the outer circumferences of the aforementioned saw pearls. Such an arrangement of the respective saw pearls on a saw wire achieves that the binding means of the saw pearls with the largest outer circumference is first and after a short time removed, and these saw pearls very quickly provide their full cutting performance. In the case of further wear, the next smaller saw pearls are then each included in the cutting process until they too prvide their full cutting performance. This operating sequence takes place until the smallest saw pearls and all other saw pearls are completely worn. An almost constant high cutting performance of the saw wire is achieved, in this manner, over the entire duration of use of the saw wire, starting directly after the start of the operation.

It is possible to provide the saw pearls, for example, with a triangular or square cross section. The cutting performance of an inventive saw wire is, however, particularly constant and high and in addition independent of a possible twisting of the saw wire about its longitudinal axis when the saw pearls are circular-cylindrical.

A saw wire of the invention can be manufactured particularly simply and inexpensively when, according to another advantageous further development of the invention, the saw pearls are mounted directly onto the saw wire. The saw pearls can be fastened in various ways, for example through sintering thereon.

The saw pearls can be premanufactured independently of the saw wire when between each of the saw pearls and the saw wire there is arranged a support member having a center bore or recess. The saw pearls can, in this manner, be applied, for example through sintering, onto the support member, after which the support member, at a later point in time and, if necessary at a different place, is moved onto the saw wire and is fastened thereon. It is of particular advantage for a fixed hold of the support member on the saw wire when the bore has at its surface grooving, rastering or toothing.

A good protection exists in particular against corrosion and mechanical damage when the saw wire and/or the saw pearls have a coating. If the saw pearls are each mounted on a support member, then the hold of the support member on the saw wire is advantageously further improved when at least one part of the coating is arranged between the support member and the saw wire. The coating advantageously has a plastic, thus it is particularly easily applied, for example via an injection molding method, onto the saw wire and/or the saw pearls and offers very good protection.

According to another further advantageous development of the invention, the binding means of the saw pearls is metallic. The hard bodies necessary for a high cutting performance can be particularly easily bound into such a metallic binding means.

It is of a particular advantage, when the hard bodies of the saw pearls are diamond granules, for the granules to have a size of, for example, 0.5 mm. The diamond granules enable a particularly high cutting performance of the wire saw.

According to another advantageous further development of the invention, the saw wire is a steel wire, which can consist, for example, of a larger number of wires which are twisted together. The saw wire can then be manufactured easily and inexpensively and guarantees high durability.

BRIEF DESCRIPTION OF THE DRAWINGS

The invention permits a number of embodiments. Several of these will be described hereinafter in connection with the drawings, in which:

FIGS. 4 and 5 are each cross-sectional illustrations of a section of a further inventive saw wire with one saw pearl;

FIG. 6 is a side view of a section of a further inventive saw wire with saw pearls.

DETAILED DESCRIPTION OF THE INVENTION

Figure 1:
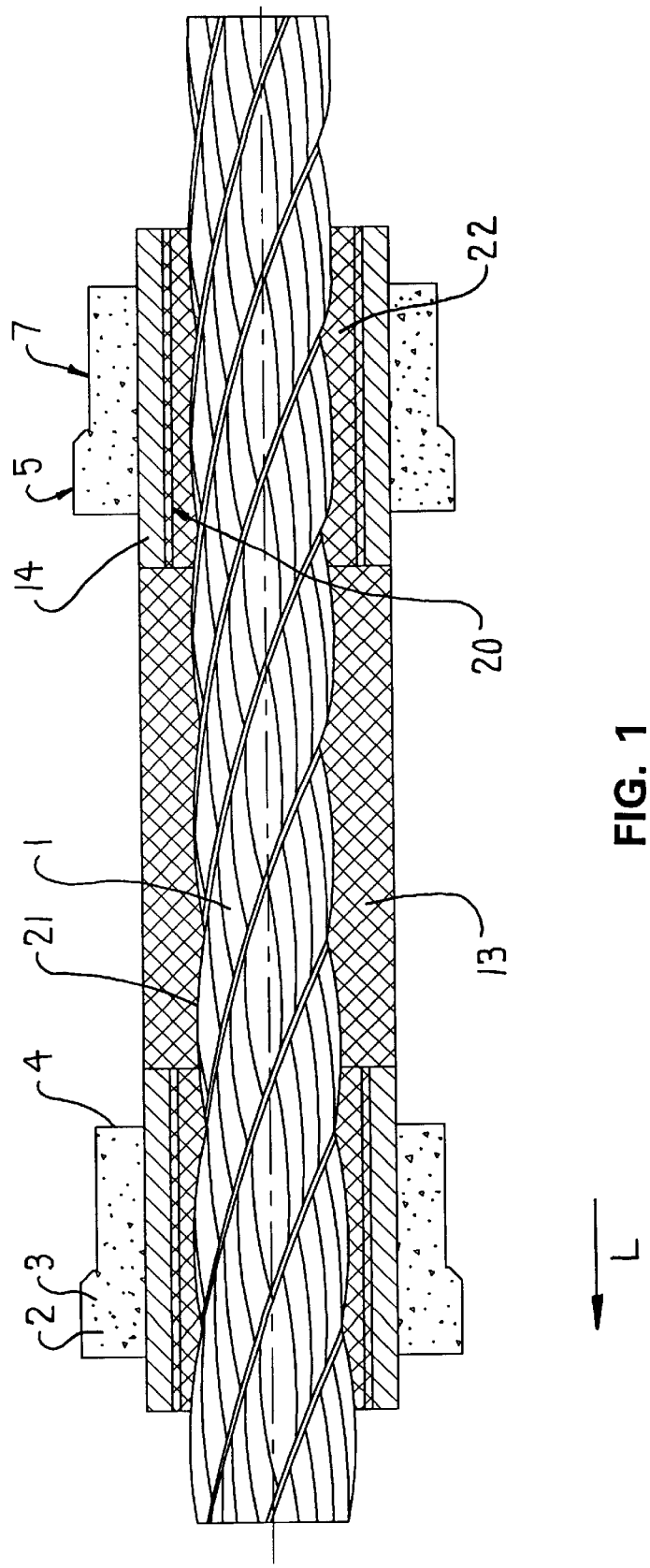
FIG. 1 is a cross-sectional illustration of a section of an inventive saw wire with saw pearls.

FIG. 1 illustrates a section of a steel wire 1 for a here not illustrated wire saw, which steel saw wire 1 consists of a plurality of individual wires, which are twisted with one another. The saw wire 1 has spaced-apart, circular-cylindrical saw pearls 4, which have hard bodies 3 in the form of diamond granules. The diamond granules have a size of, for example, 0.5 mm and are bound into a binding means 2, preferably a metallic binding matrix. The saw pearls 4 are each applied to a support member 14 made of a metal sleeve, which has a grooving on its inner surface 20; this can, for example, be done by sintering the metallic binding means 2 with the diamond granules 3 onto the metal sleeve 14, whereby the saw pearls 4 are shrunk onto the sleeve 14.

The grooving on the inner surface 20 of the metal sleeve-shaped support members 14 holds the saw pearls 4 securely on the saw wire 1. In addition the outer surface 21 of the saw wire 1 has a coating 13, which in the illustrated embodiment consists of a plastic mixture, which can, for example, be sprayed onto the saw wire 1, whereby the plastic mixture can also penetrate into the spaces 22 between the support members 14 and the saw wire 1 and thus creates the hold of the support member 14 with the saw pearls 4 on the saw wire 1.

The saw pearls 4 each have an area 5 with a larger outer circumference and an area 7 with a smaller outer circumference. The areas 5 with a larger outer circumference project farther from the saw wire 1 than the areas 7 with a smaller outer circumference. It can be recognized that the area 5 with a larger outer circumference of the saw pearls 4 is arranged in an intended direction of movement L of the saw wire 1 in each case in front of the area 7 with a smaller outer circumference. When the saw wire 1, during the start of a sawing operation, is moved, then first the areas 5 with a larger outer circumference are used. Since these areas have only a small longitudinal extent, which is less than the longitudinal extent of the areas 7 with a smaller outer circumference, the diamond granules of the hard bodies 3 are very quickly exposed and can actively particulate in the sawing performance. Only slowly, when the areas with a larger outer circumference start to wear, the diamond granules 3 in the areas 7 with a smaller outer circumference are being used and contribute actively to the sawing performance. With this a high initial sawing performance and a constant course of the sawing performance over the time of use of the saw wire 1 is achieved.

Figure 2A:
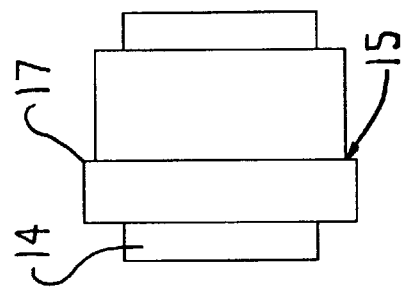
FIGS. 2a–3d are side views of various inventive saw pearls.
Figure 2B:
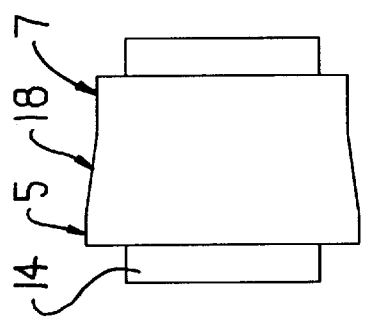
Figure 2C:
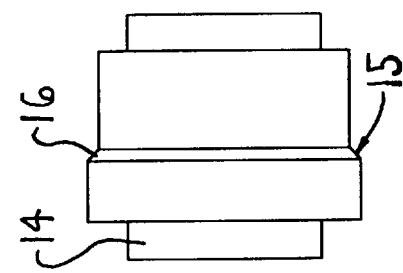
Figure 2D:
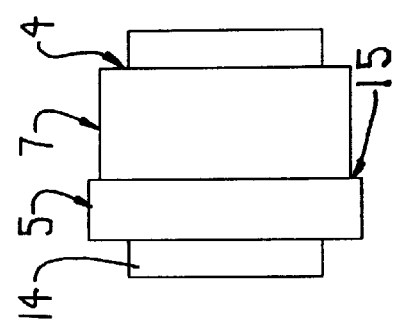

FIGS. 2a to 2d each show a side view of a saw pearl 4 mounted on a sleeve-shaped support member 14. In these and also in the other figures, the corresponding structural elements are identified with the same reference numerals. In the embodiments according to FIGS. 2a, 2b and 2d, each one area 7 with a smaller outer circumference of the saw pearl 4 passes over with a step 15 into an area 5 with a larger outer circumference. The step in FIG. 2a is designed angularly and rectangularly, whereas a step 15 in FIG. 2b has an inclination 16 and a step 15 in FIG. 2d has a curve 17. The inclination 16 and the curve 17 increase the strength of the respective saw pearl 4 and prevent an abrupt transition between the area 5 with a larger outer circumference of the saw pearls 4 and the area 7 with a smaller outer circumference. Particularly advantageous is thereby an embodiment of a saw pearl 4 according to FIG. 2c, whereby an area 7 with a smaller outer circumference of the saw pearl 4, forming a cone 18, transfers continuously into an area 5 with a larger outer circumference.

Figure 3A:
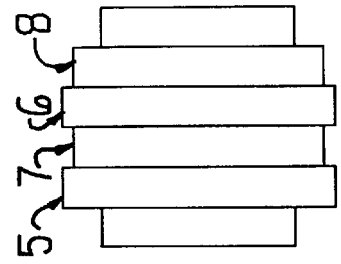
Figure 3B:
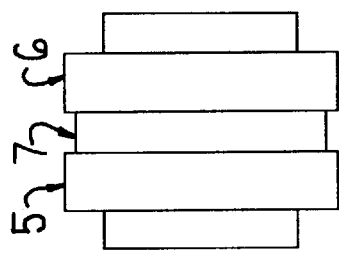
Figure 3C:
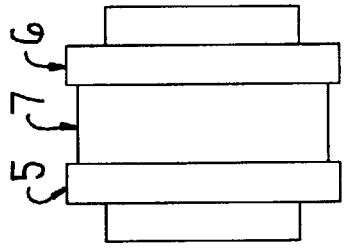
Figure 3D:
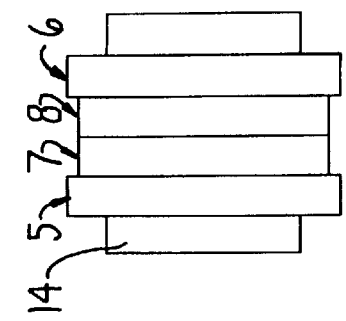

Various saw pearls having two areas with a larger outer circumference are illustrated in FIGS. 3a to 3d. According to FIG. 3a, two areas 5, 6 with a larger outer circumference of a saw pearl 4 limit thereby or sandwich two areas 7, 8 with a smaller outer circumference. The various areas can have, for example, different hard bodies 3 and/or different binding means 2 in order to optimize the course of the sawing performance. According to FIG. 3b, the different areas with a smaller outer circumference according to FIG. 3a are combined to one single area 7, whereby the longitudinal extent of this area corresponds approximately with the sum of the longitudinal extents of two laterally adjoining areas 5, 6 with a larger outer circumference. Whereas an area 7 with a smaller outer circumference of a similar saw pearl 4 according to FIG. 3*c* has a lesser longitudinal extent than the sum of the longitudinal extents of the areas 5, 6 with a larger outer circumference. A saw pearl 4 according to FIG. 3*d* has alternatingly an area 5, 6 with a larger outer circumference and an area 7, 8 with a smaller outer circumference, whereby the longitudinal extent of the areas 5–8 have approximately the same size. The selection of the outer contour of the saw pearls 4 depends on the binding means 2, which is used, the hard bodies 3, which are used, the desired initial sawing performance and on the material of the workpiece to be sawed.

A saw pearl 4, which is mounted, for example with a sinter process, directly onto a saw wire 1, is illustrated in FIG. 4. In particular, in the case of a grooved surface structure of the saw wire 1, as it exists in this exemplary embodiment, the saw wire 1 consists of a plurality of individual wires, which are twisted together so that a secure hold of the saw pearl 4 on the saw wire 1 is guaranteed.

Whereas in the embodiment according to FIG. 5, a saw pearl 4 is mounted on a hollow-cylindrical support member 14, for example a metal sleeve. The hollow-cylindrical support member 14 has on an inner surface 20 of a bore 19 a rough surface structure, for example a grooving, rastering or toothing, or with a surface roughness, or rather surface porosity, so that through an engagement of the inner surface 20 of the support member 14 and of the outer surface of the saw wire 1, a secure hold of the saw pearl 4 on the saw wire 1 is assured.

FIG. 6 illustrates a saw wire 1 with circular-cylindrical saw pearls of different diameter, whereby in each case saw pearls 9, 10 with a larger diameter, namely larger outer circumference, and saw pearls 11, 12 with a smaller diameter, namely smaller outer circumference, alternate. In the illustrated exemplary embodiment with saw pearls having two different outer circumferences, the direction of movement of the saw wire 1 can be chosen freely. However, it is also possible to arrange between the saw pearls 10 and 12, and saw pearls 9 and 11, each with different diameters, one or several saw pearls with diameters lying between the diameters of the saw pearls 9, 10 and 11, 12, whereby then the intended direction of movement of the saw wire 1 is the illustrated direction of movement L. Thus at the start of the time of use of the saw wire 1 first the saw pearls with the largest diameter bring about the cutting performance and with the wear of these saw pearls, saw pearls having a smaller diameter are added. It is therefore advantageous, when the diameter of the saw pearls is reduced against the direction of movement of the saw wire within a given time to have the other saw pearls of lesser original diameter assist in cutting. The saw pearls can be considered to form zones which extend from one saw pearl with the largest diameter to one saw pearl with the smallest diameter.

Figure 7:
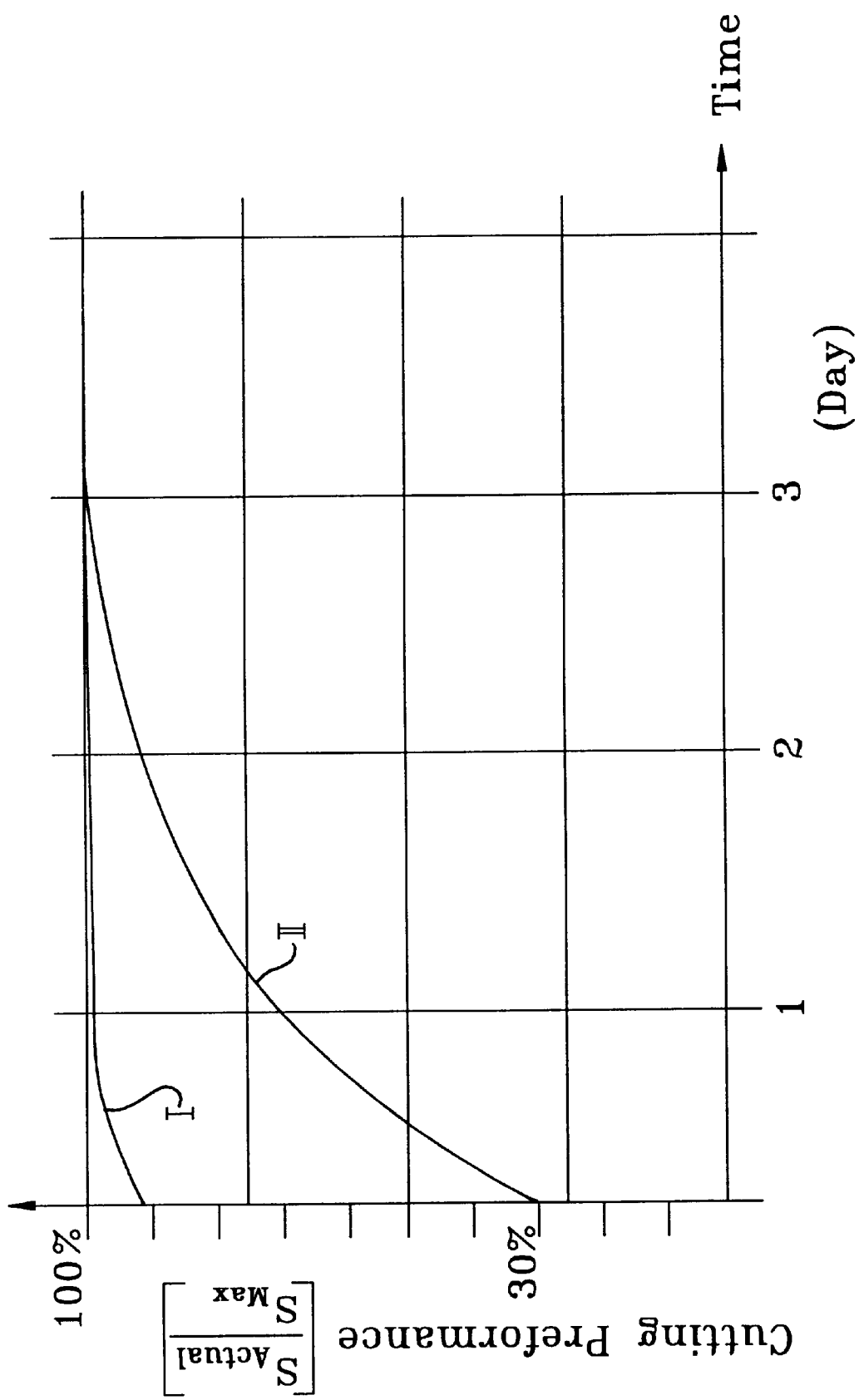
FIG. 7 illustrates a cutting performance time-dependency diagram.

FIG. 7 illustrates a curve II of the cutting performance (actual cutting performance $S_{actual}$ in relationship to the maximum cutting performance $S_{max}$) of a saw wire 1 with common saw pearls in comparison to a curve I of the corresponding cutting performance of a saw wire with saw pearls having areas of different outer circumference along each section of the wire saw. It can be recognized that the curve II reaches its maximum (100%) corresponding to the maximum cutting performance only on the third day of use, whereby during the first day of use the cutting performance increases from merely 30% to approximately 70%. Whereas the curve I reaches almost its maximum already on the first day of use, whereby directly after the start of use already over 90% of the cutting performance is available.

The embodiments of the invention in which an exclusive property or privilege is claimed are defined as follows:

1. A saw wire for use with a wire saw, said saw wire having at least one saw pearl, said saw pearl including a large circular-cylindrical shaped area having hard bodies bound into a binding means to define a large outer circumference and a second adjacent circular-cylindrical shaped area having hard bodies bound into a binding means to define a smaller outer circumference.

2. The saw wire according to claim 1, where the first area of the saw pearl having a large outer circumference is arranged in an intended direction of movement of said saw wire in front of the second area having a smaller outer circumference.

3. The saw wire according to claim 2, wherein the saw pearl includes in the intended direction of movement behind the second area having a smaller outer circumference, a further third area having hard bodies bound into a binding means to define an outer circumference larger than the outer circumference of the second area.

4. The saw wire according to claim 3, wherein the further third area having a large outer circumference is followed by a fourth area having hard bodies bound into a binding means to define a smaller outer circumference than the outer circumference of the third area.

5. The saw wire according to claim 1, wherein the first area of the saw pearl having a large outer circumference includes, in the direction of movement of the saw wire, a lesser extent than the second area having a smaller outer circumference.

6. The saw wire according to claim 1, wherein the second area of the saw pearl having a smaller outer circumference transfers with a step into the first area having a larger outer circumference.

7. The saw wire according to claim 6, wherein the step includes an inclination or a curve.

8. The saw wire according to claim 1, wherein the second area of the saw pearl having a smaller outer circumference forms a cone and transfers continuously into the first area having a large outer circumference.

9. The saw wire according to claim 1, wherein said saw pearl is applied directly to the saw wire.

10. The saw wire according to claim 1, wherein between said saw pearl and the saw wire there is arranged a support member having a center bore.

11. The saw wire according to claim 10, wherein the bore includes a grooving, rastering or toothing on a surface thereof.

12. The saw wire according to claim 10, wherein the saw wire or said saw pearl is provided with a coating.

13. The saw wire according to claim 12, wherein at least one part of the coating is arranged between said support member and the saw wire.

14. The saw wire according to claim 12, wherein the coating comprises a plastic.

15. The saw wire according to claim 1, wherein said binding means of said saw pearl is metallic.

16. The saw wire according to claim 1, wherein said hard bodies of said saw pearl are diamond granules.

17. The saw wire according to claim 1, wherein the saw wire is a steel wire.

* * * * *

UNITED STATES PATENT AND TRADEMARK OFFICE
CERTIFICATE OF CORRECTION

PATENT NO    : 6 131 558
DATED        : October 17, 2000
INVENTOR(S)  : Ludger WEBER It is certified that error appears in the above-identified patent and that said Letters Patent are hereby corrected as shown below:

```
Column 6, line 9; change "large circular-cylindrical" to
                 ---first circular-cylindrical---.
```

Signed and Sealed this

Twenty-second Day of May, 2001

Attest:

NICHOLAS P. GODICI

Attesting Officer

Acting Director of the United States Patent and Trademark Office